US009333855B2

(12) United States Patent
Krogger et al.

(10) Patent No.: US 9,333,855 B2
(45) Date of Patent: May 10, 2016

(54) TRANSFER CASE

(75) Inventors: Markus Krogger, Waldbach (AT);
Stefan Leitgeb, Kainbach bei Graz (AT);
Alois Lafer, Kainbach bei Graz (AT)

(73) Assignee: Magna Powertrain AG & Co KG,
Lannach (AT)

( * ) Notice: Subject to any disclaimer, the term of this patent is extended or adjusted under 35 U.S.C. 154(b) by 9 days.

(21) Appl. No.: 14/347,029

(22) PCT Filed: Aug. 29, 2012

(86) PCT No.: PCT/EP2012/066786
§ 371 (c)(1),
(2), (4) Date: Apr. 16, 2014

(87) PCT Pub. No.: WO2013/045193
PCT Pub. Date: Apr. 4, 2013

(65) Prior Publication Data
US 2015/0040721 A1    Feb. 12, 2015

(30) Foreign Application Priority Data

Oct. 1, 2011  (DE) .......................... 10 2011 114 788
Oct. 15, 2011 (DE) .......................... 10 2011 116 143

(51) Int. Cl.
*F16H 37/06*  (2006.01)
*B60K 17/344* (2006.01)
(Continued)

(52) U.S. Cl.
CPC ............... *B60K 17/344* (2013.01); *B60K 17/24* (2013.01); *B60K 17/342* (2013.01); *B60K 17/35* (2013.01); *F16H 57/021* (2013.01); *F16H 2057/02052* (2013.01); *Y10T 74/19079* (2015.01); *Y10T 74/19102* (2015.01)

(58) Field of Classification Search
CPC ... B60K 17/344; B60K 17/3462; F16H 37/06
USPC ........................... 74/665 G, 665 GA, 665 GE
See application file for complete search history.

(56) References Cited

U.S. PATENT DOCUMENTS 4,119,168 A   10/1978 Fogelberg
4,447,194 A    5/1984 Worby (Continued)

FOREIGN PATENT DOCUMENTS

DE        10160026 A1    6/2003
DE    102004052870 A1    6/2005

(Continued)

OTHER PUBLICATIONS

Internetional Search Report mailed Nov. 20, 2012 (PCT/EP2012/066786).

*Primary Examiner* — Ha D Ho
(74) *Attorney, Agent, or Firm* — Dickinson Wright PLLC

(57) ABSTRACT

A transfer case for transferring a driving torque of a driving unit of a motor vehicle to a first axle and a second axle of the motor vehicle. The transfer case includes a housing, an input shaft allocated to the driving unit, a first driven shaft allocated to the first axle, and a second driven shaft allocated to the second axle and offset parallel to the input shaft. The transfer case further includes an offset drive for transmitting driving torque from the input shaft to the second driven shaft. The offset drive comprises a gear wheel coaxial to the input shaft or to the driven shaft. The gear wheel is rotatably mounted on a section of the housing.

21 Claims, 5 Drawing Sheets

(51) Int. Cl.
  *B60K 17/35* (2006.01)
  *F16H 57/021* (2012.01)
  *B60K 17/24* (2006.01)
  *B60K 17/342* (2006.01)
  *F16H 57/02* (2012.01)

(56) References Cited

U.S. PATENT DOCUMENTS

| | | |
|---|---|---|
| 4,714,129 A | 12/1987 | Mueller |
| 4,848,508 A | 7/1989 | Smirl et al. |
| 5,827,145 A * | 10/1998 | Okcuoglu ................. 475/88 |
| 6,679,799 B2 * | 1/2004 | Bowen ................. 475/5 |
| 2003/0126935 A1 * | 7/2003 | Matzschker et al. ........... 74/335 |
| 2004/0082433 A1 | 4/2004 | Williams |
| 2005/0098386 A1 * | 5/2005 | Allen et al. ................. 184/6.12 |

FOREIGN PATENT DOCUMENTS

| | | |
|---|---|---|
| DE | 102008032475 A1 | 1/2010 |
| EP | 193704 A1 | 9/1986 |
| JP | 01119423 A | 5/1989 |
| KR | 20100007783 A | 1/2010 |

\* cited by examiner

TRANSFER CASE

CROSS-REFERENCE TO RELATED APPLICATIONS

This application is a National phase of International Application No. PCT/EP2012/066786 filed on Aug. 29, 2012 and which claims priority to German Application No. DE102011114788.1 filed on Oct. 1, 2011 and German Application No. DE102011116143.4 filed on Oct. 15, 2011. The entire disclosure of each of the above applications is incorporated herein by reference.

TECHNICAL FIELD

The present invention relates to a transfer case for transferring a driving torque of a driving unit of a motor vehicle to a first axle and a second axle of the motor vehicle.

BACKGROUND

Transfer cases are used for distributing a driving torque produced by the driving unit of the motor vehicle to a number of outputs. Typically, transfer cases of this kind are used in motor vehicles with continuous or selectable all-wheel drive. They transfer the torque produced by the driving unit to two driven axles of the vehicle, and the distribution is predetermined or can be freely selected, depending on the construction of the transfer case. In order to be able to control the transmission of the torque to the two axles of the motor vehicle, a clutch unit is provided for example, offering the driver of the motor vehicle the possibility of choosing between a continuous two-wheel drive mode, in which the vehicle is driven exclusively via a primary axle, and an automatic four-wheel drive mode—referred to as an "on-demand drive mode". In this mode, depending on the driving conditions, a certain proportion of the driving torque is transmitted to the wheels of the other axle (a secondary axle) in order to provide temporary four-wheel drive.

In principle, the transfer case can also be designed to include a controllable center differential, in which a clutch unit is provided to adjust the distribution of driving torque in the longitudinal direction of the vehicle.

SUMMARY

In view of continuously growing requirements on the energy efficiency of a motor vehicle, it is an object of the present invention to provide a transfer case of the type described above which, while being of robust and reliable construction, has an improved efficiency.

Accordingly, the transfer case of the present disclosure comprises a housing, an input shaft for introducing driving torque into the transfer case, and a first driven shaft for outputting driving torque to the first axle of the motor vehicle, and a second driven shaft for outputting driving torque to the second axle of the motor vehicle, wherein the second driven shaft is offset parallel to the input shaft. The transfer case furthermore comprises an offset drive for transmitting driving torque from the input shaft to the second driven shaft, wherein the offset drive comprises a gear wheel coaxial to the input shaft or to the first driven shaft.

In accordance with the invention, the gear wheel of the offset drive is rotatably mounted on a section of the housing of the transfer case. Thus, reliable mounting of the gear wheel is ensured and can furthermore be implemented in a manner which is simple and inexpensive in terms of design. Moreover, it is ensured that the rotational speed difference that has to be absorbed via the bearing assembly—i.e. the difference in rotational speed between the gear wheel and the component supporting the gear wheel—is at most the rotational speed of the gear wheel.

Mounting the gear wheel of the offset drive on the housing is advantageous particularly in the case of embodiments of the transfer case in which the gear wheel comprises an aperture, through which the input shaft or the first driven shaft extends coaxially. In this case namely, there can be considerable differences in rotational speed between the gear wheel and the input shaft or the first driven shaft in many driving situations, and these have to be absorbed by a correspondingly dimensioned bearing assembly. By means of the above-described construction of the transfer case, in contrast, the differences in rotational speed which occur are limited, for which reason the bearing assembly can be of correspondingly simpler design. Moreover, there are lower efficiency losses in the transfer case.

Provision can be made for the first driven shaft to be connected to the input shaft with continuous driving effect (e.g. connection via a differential, fixed connection or integral embodiment).

In principle, the second driven shaft of the transfer case can also be connected to the input shaft with continuous driving effect (e.g. via a differential). As an alternative, the transfer case comprises a clutch unit by means of which the second driven shaft can be decoupled selectively from the input shaft.

In accordance with one embodiment, the housing section supporting the gear wheel of the offset drive is an extension, which is of sleeve-shaped design, at least sectionwise, and which surrounds the input shaft or the first driven shaft, at least sectionwise. The extension preferably extends at least partially into the aperture of the gear wheel. The extension can be arranged, at least sectionwise, between the gear wheel and the input shaft or the first driven shaft. The extension is preferably formed separately from the other sections of the housing. In particular, the extension can be secured releasably on the housing of the transfer case, in particular being screwed to the housing.

In other words, an extension of this kind—whether secured releasably on the housing or connected permanently to the latter—can be designed at least partially as a sleeve which surrounds the input shaft or the first driven shaft and on which the gear wheel is mounted.

The housing section (in particular the extension) preferably surrounds the input shaft or the first driven shaft without making contact. In particular, there is no separate bearing between the extension and the input shaft or first driven shaft.

Efficient bearing support for the gear wheel can be provided by arranging a rolling contact bearing, preferably a radial bearing, in particular a needle bearing, between the gear wheel and the housing section (in particular the extension).

In accordance with an embodiment of advantageous and compact design, the extension has, radially on the outside, a bearing race surface which interacts with rolling contact elements of the radial bearing, wherein the bearing race surface is preferably a hardened section of the extension. In other words, the bearing race surface of the extension acts as a component of the rolling contact bearing. Arranging the bearing race surface on the outside allows relatively simple processing of the extension in this area. In particular, the extension is hardened in the area of the bearing race surface. Ultimately, the extension in the embodiment described above itself forms the bearing inner ring, thus reducing the number of installed components and also saving installation space.

The assembly of the transfer case is simplified if the extension can be mounted in an accurate position on the housing by means of a centering device. The centering device comprises at least one guide element, which is formed on the extension and interacts with at least one centering element of complementary configuration formed on the housing. Subsequently or simultaneously, the extension can be screwed to the housing, for example, i.e. secured releasably.

In certain cases, however, it can be advantageous to secure the extension permanently on the housing, e.g. by welding or a shrink fit, or to form it integrally with the housing.

A further simplification of the assembly of the extension is obtained if the housing has a mounting collar, on which the extension can be secured. Since the mounting collar increases the stability of the housing, it can additionally be used to support the input shaft or the first driven shaft.

Provision can be made for the gear wheel to be supported on the extension in the axial direction. For this purpose the extension can have a collar or flange formed integrally therewith, for example. Axial support can also be provided, for example, by means of a snap ring that can be secured on the extension.

The gear wheel can be a chain sprocket, for example, if the offset drive forms a chain drive. As an alternative, it is possible for the gear wheel to be part of a gear drive, wherein in this case the gear wheel is connected to an output gear wheel of the gear drive with driving effect via an idler gear.

The invention furthermore relates to a powertrain having a transfer case in accordance with at least one of the embodiments described above, wherein the transfer case comprises a clutch unit by means of which the second driven shaft can be supplied selectively with driving torque, and wherein the powertrain comprises a further clutch which is arranged between the clutch unit of the transfer case and at least one wheel of the motor vehicle and the purpose of which is to deactivate a section of the powertrain situated between the clutch unit and the clutch.

In other words, the second axle of the motor vehicle or at least one wheel on the second axle can be separated from the remainder of the powertrain by the further clutch, the result being that the section of the powertrain is deactivated when the clutch unit and a further clutch are open. A deactivatable powertrain section can be provided, for example, on a motor vehicle having a continuously driven primary axle and a selectively driven secondary axle. On a motor vehicle of this kind, a friction clutch can be arranged between the input shaft and the offset drive in the transfer case, and a suitable separating clutch (positive clutch or likewise a friction clutch) can be arranged in the region of an axle differential of the secondary axle. By opening both clutches, that section of the powertrain (e.g. a cardan shaft) which lies between them is deactivated. This makes it possible to prevent a situation where, in the two-wheel drive mode, i.e. when only the primary axle is being driven, unnecessary parts of the powertrain are moved as well, something that would weigh on fuel efficiency.

A powertrain having a powertrain section which can be deactivated is known from DE 10 2009 005 378 A1, for example. In powertrains of this kind, the abovementioned problem occurs that moving parts in the transfer case have relatively large rotational speed differences, despite part of the powertrain being deactivated. By mounting the gear wheel of the offset drive on the housing of the transfer case, the frictional losses caused by the transfer case are minimized. If, for example, the second driven shaft of the transfer case can be deactivated, the bearing assembly of the gear wheel of the offset drive is only subject to stress when the second driven shaft is in fact being supplied with driving torque. This is because, when that part of the powertrain which is allocated to the secondary axle is deactivated, the gear wheel does not move and there is no rotational speed difference between the gear wheel and that section of the housing which supports the gear wheel.

Further embodiments of the invention are indicated in the claims, the description and the attached drawings.

DRAWINGS

The present invention is explained purely by way of example below by means of advantageous embodiments with reference to the attached drawings, in which.

DESCRIPTION

Figure 1:
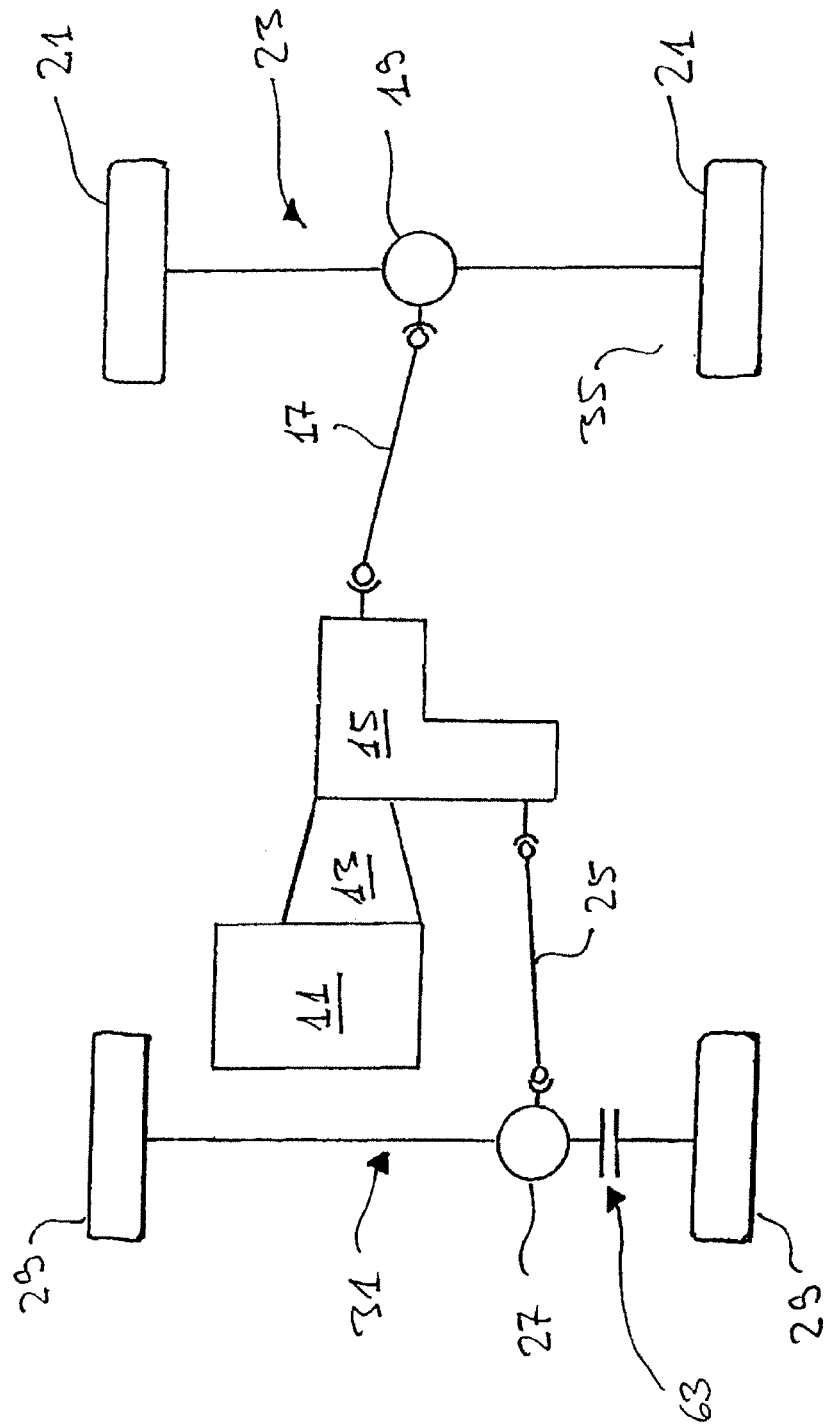
FIG. 1 illustrates a schematic view of a powertrain of a motor vehicle having a powertrain section which can be deactivated selectively.

FIG. 1 illustrates schematically a powertrain of a motor vehicle having selectable all-wheel drive. The driving torque produced by a motor 11—e.g. an internal combustion engine or an electric motor (a hybrid drive of any desired design is also conceivable)—is fed to a transfer case 15 by means of a main transmission 13—e.g. a manual transmission or an automatic transmission. A first output of the transfer case 15 is coupled to a rear axle differential 19 via a first cardan shaft 17. As a result, wheels 21 on a rear axle 23 of the motor vehicle are continuously driven. The rear axle 23 thus forms the primary axle of the vehicle. A second output of the transfer case 15 is coupled to a front axle differential 27 via a second cardan shaft 25. As a result, part of the driving torque of the motor 11 can be transmitted selectively to the wheels 29 on a front axle 31. The front axle 31 thus forms the secondary axle of the vehicle. A clutch 63, the operation of which will be explained in greater detail below, is provided between the front axle differential 27 and a wheel 29 on the front axle 31 (here the front left-hand wheel of the vehicle).

Figure 2:
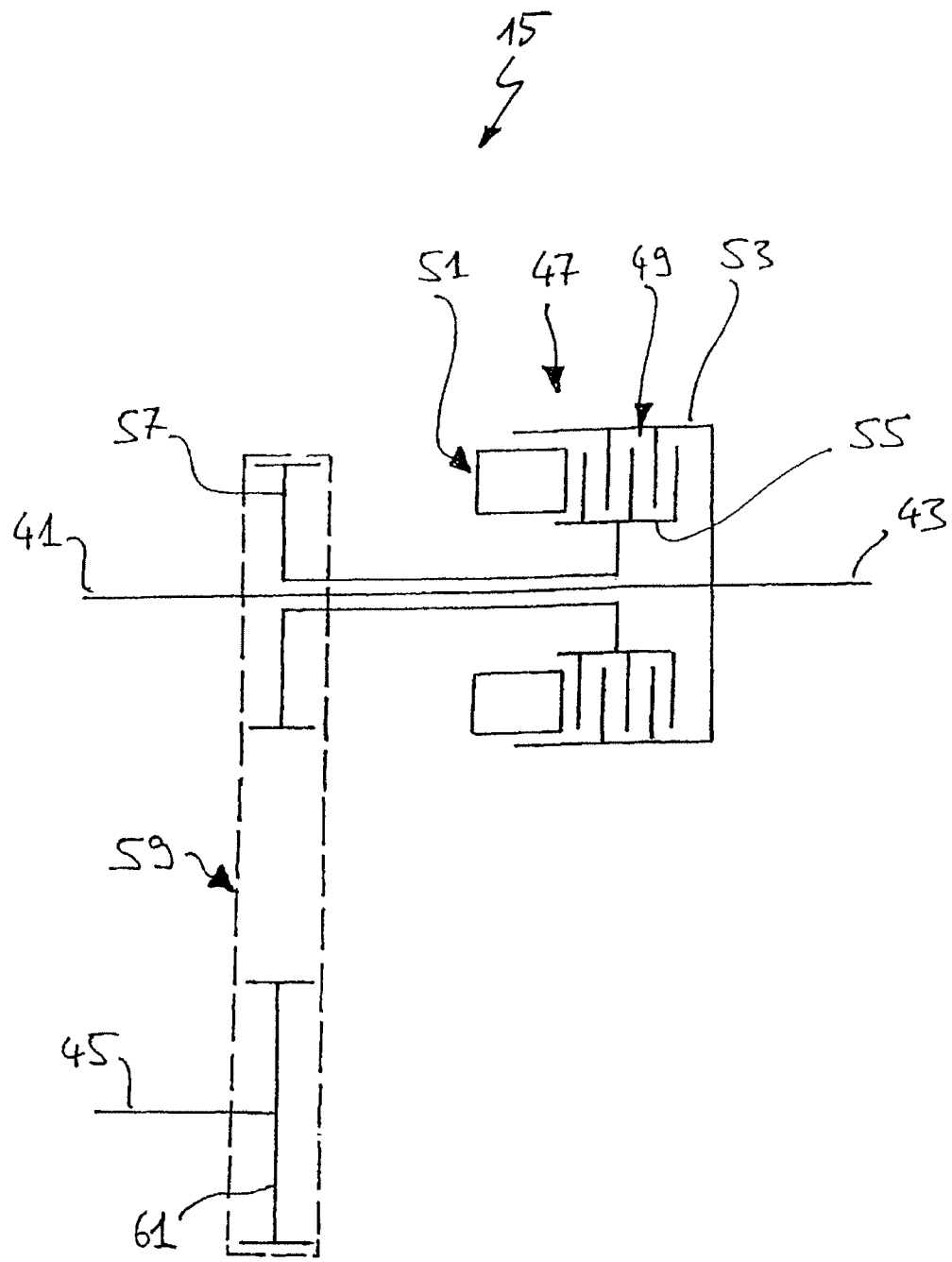
FIG. 2 illustrates a schematic view of a transfer case.

FIG. 2 illustrates a schematic view of the transfer case 15 illustrated in FIG. 1. The transfer case 15 has an input shaft 41, a first output shaft 43 and a second output shaft 45. The first output shaft 43 is of coaxial design with the input shaft 41 and is fixed to the latter for conjoint rotation, preferably being integral therewith. The second output shaft 45 is arranged offset in parallel with the input shaft 41.

The transfer case 15 furthermore comprises a clutch unit 47 having a friction clutch 49 and an actuator 51. The friction clutch 49 has a clutch cage 53 which is connected for conjoint rotation with the input shaft 41 and the first output shaft 43 and which carries a plurality of first clutch disks. The friction clutch 49 furthermore has a rotatably mounted clutch hub 55 which likewise carries a plurality of second clutch disks which engage in an alternating arrangement with the first clutch disks of the clutch cage 53. The clutch hub 55 is connected for conjoint rotation to a first or driving gear wheel 57 of an offset drive unit shown configured as a chain drive 59. A second or driven gear wheel 61 of the chain drive 59 is connected for conjoint rotation to the second output shaft 45.

Chain drive 59 also includes a continuous torque transmission element, such as a belt or chain 62, interconnecting driving gear wheel 57 to driven gear wheel 61. Instead of the chain drive 59, a gear drive can be provided having an idler gear wheel acting as the torque transmission element between the gear wheels 57, 61 for example. As a departure from the construction illustrated, the hub 55 can furthermore be connected for conjoint rotation to the shafts 41, 43. In this case, the clutch cage 53 is connected for conjoint rotation to the driving gear wheel 57. It is self-evident that the actuator 51 should then expediently be arranged in a manner different from that illustrated.

By actuation of the actuator 51 in the sense of engagement of the friction clutch 49, an increasing proportion of the driving torque introduced into the transfer case 15 via the input shaft 41 can be transmitted to the second output shaft 45.

However, if the clutch unit 47 is open, those components of the powertrain which are allocated to the second output shaft 45 rotate at the same time while the vehicle is in motion, although no driving torque is to be transmitted via this part of the powertrain. To prevent this, the clutch 63 already mentioned above is provided on the front axle 31 (secondary axle). If the clutch 63 is opened while clutch unit 47 is open, that part of the powertrain situated in between is deactivated, ultimately preventing the chain drive 59 from being moved unnecessarily at the same time.

The clutch 63 may be a claw clutch, for example. Provision can be made for the clutch 63 to be allocated a dedicated control unit. In many cases, however, it is advantageous if the clutch unit 47 and the clutch 63 are actuated by a common control unit.

Figure 3:
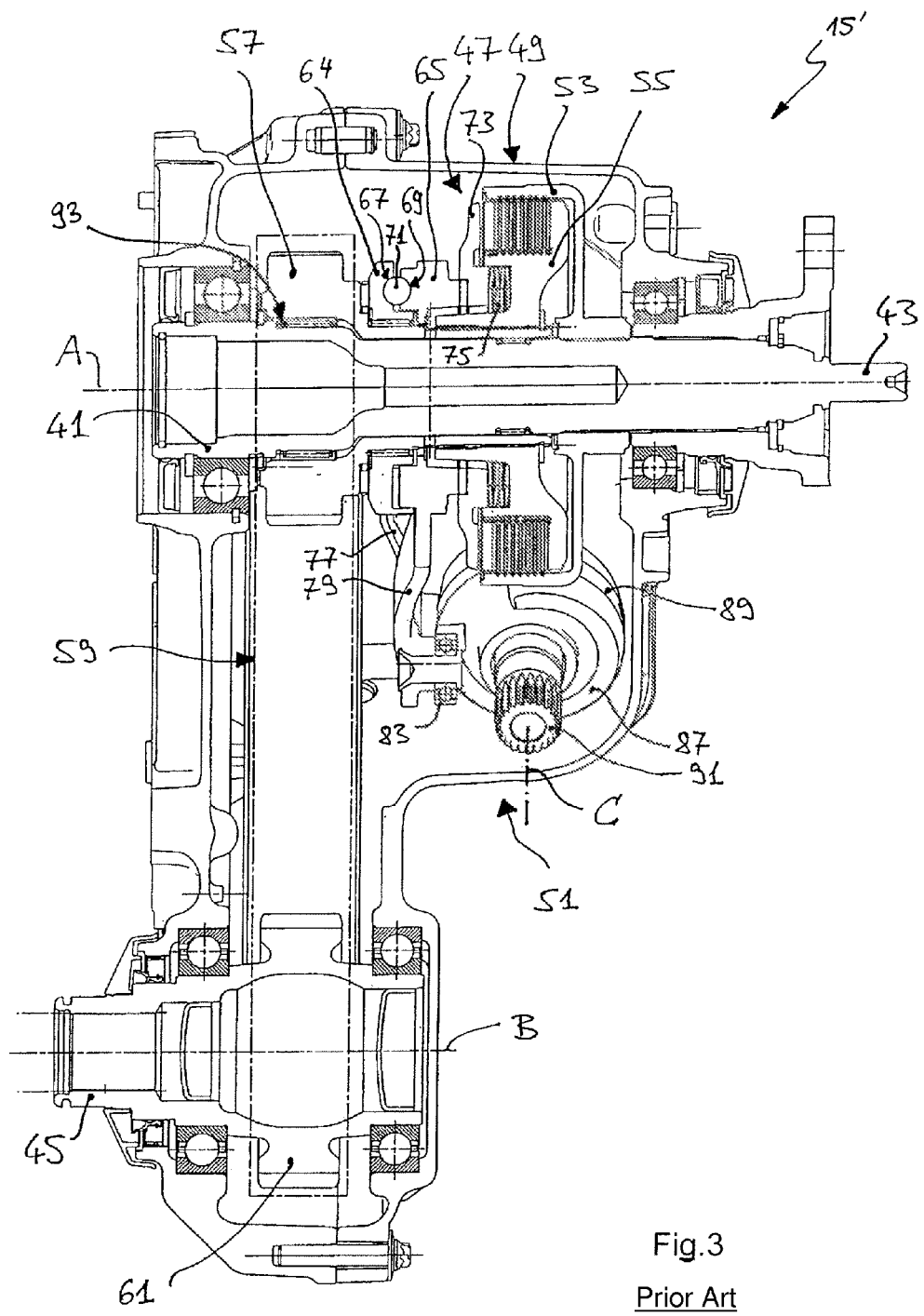
FIG. 3 illustrates a cross-sectional view of a transfer case of a conventional construction.

FIG. 3 illustrates details of a transfer case 15' of conventional construction in a cross-sectional view. In particular, it can be seen that the actuator 51 has a supporting ring 64 and an actuating ring 65, which are rotatably mounted relative to an axis A of rotation of the input shaft 41 and of the first output shaft 43. The supporting ring 64 is supported axially on the driving gear wheel 57 via a thrust bearing. The actuating ring 65, in contrast, is mounted in such a way that it can slide axially. On the mutually facing sides, the supporting ring 64 and the actuating ring 65 each have a plurality of ball grooves 67 and 69 respectively. These extend in a circumferential direction relative to the axis A and have a ramp-like slope in the circumferential direction with respect to a plane normal to the axis A, i.e. the ball grooves 67, 69 have a varying depth in the circumferential direction. Each ball groove 67 in the supporting ring 64 is situated opposite a ball groove 69 in the actuating ring 65, thereby enclosing an associated ball 71. By turning at least one of the supporting ring 64 and the actuating ring 65 relative to one another, it is thus possible to make the actuating ring 65 slide axially, with the actuating ring 65 interacting via a thrust bearing with a contact pressure ring 73 of the friction clutch 49. The contact pressure ring 73 is preloaded in the direction of disengagement of the friction clutch 49 by means of a diaphragm spring arrangement 75.

Respective actuating levers 77 and 79 are formed on the supporting ring 64 and the actuating ring 65. Respective rollers 83 are rotatably mounted at the free end of each lever 77, 79 (only the roller 83 of lever 79 can be seen in FIG. 3). Via the rollers 83, the actuating levers 77, 79 interact with the two side faces 87 of a control disk 89, which can be rotated relative to an axis C. The side faces 87 slope in the circumferential direction relative to a plane normal to the axis C, i.e. the control disk 89 is of wedge-shaped design in cross section. By turning the control disk 89, the actuating levers 77, 79 can thus be moved in the manner of scissors in order to turn the supporting ring 64 and the actuating ring 65 relative to one another. The control disk 89 has an integrally formed splined stub 91. Via the stub 91, the control disk 89 can be connected with driving effect to an electric motor and an associated reduction gear (not illustrated in FIG. 3).

By appropriate activation of the electric motor, the control disk 89 can thus be driven to perform a rotary motion in order thereby to pivot the actuating levers 77, 79 relative to one another. The resulting rotation of the supporting ring 64 and of the actuating ring 65 relative to one another brings about an axial movement of the actuating ring 65. The contact pressure ring 73 thus brings about engagement of the friction clutch 49 or—assisted by the diaphragm spring arrangement 75—disengagement of the friction clutch 49.

In the transfer case 15' of conventional construction, the driving gear wheel 57 is shown supported on the input shaft 41 by a radial bearing 93. Although a compact construction is thereby achieved, the radial bearing 93 must absorb the rotational speed differences between the components 41, 57. When the clutch 63 is open, this admittedly means that the driving gear wheel 57 is no longer actively driven if the clutch unit 47 is simultaneously open. Apart from effects resulting from drag torques, the driving gear wheel 57 is therefore essentially stationary in such a state. However, there is nevertheless a large rotational speed difference between the rotating input shaft 41 and the ideally stationary driving gear wheel 57, and this leads to disadvantageous frictional losses.

Figure 4:
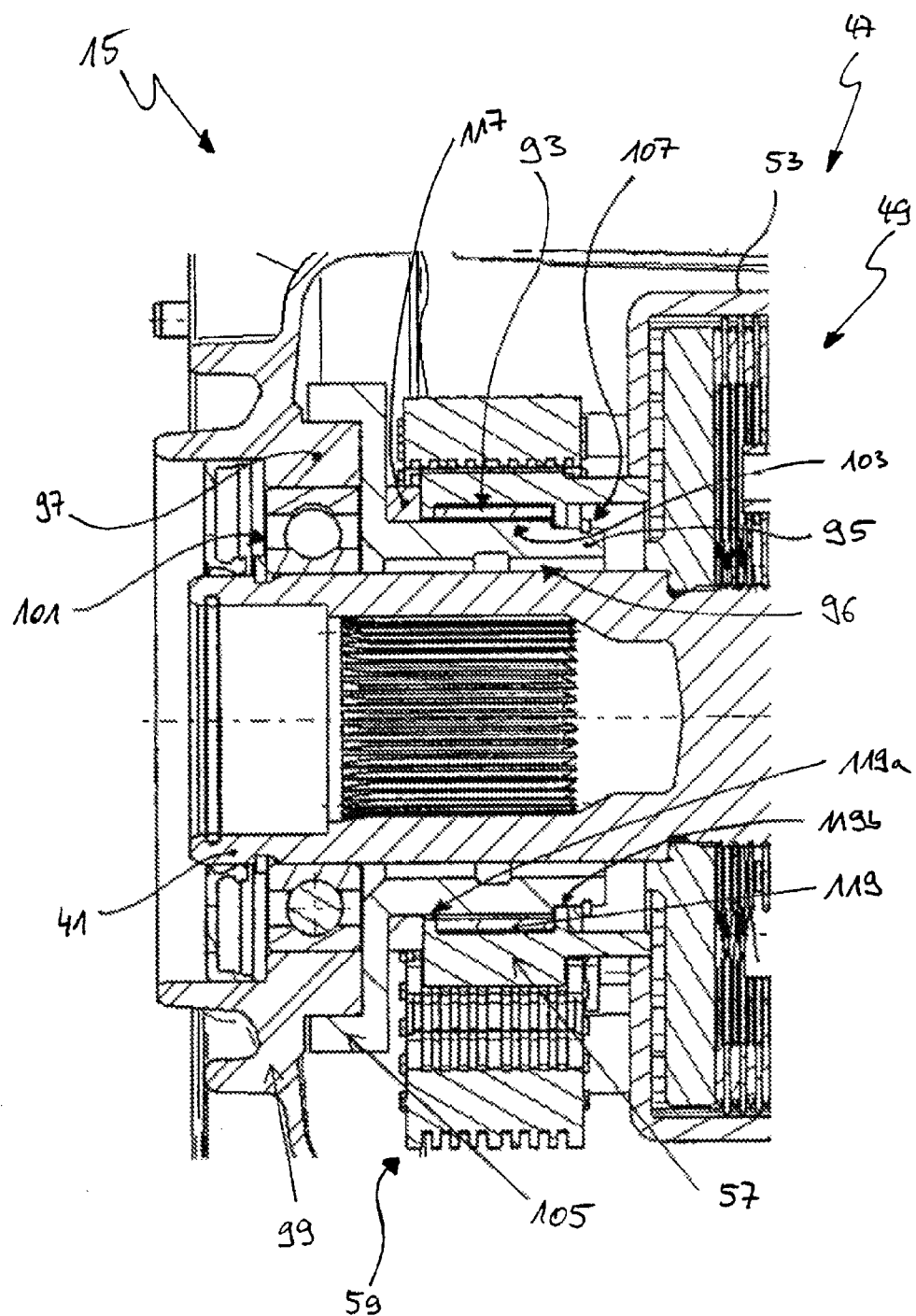
FIG. 4 illustrates a portion of a cross-sectional view of an embodiment of the transfer case constructed according to the invention.

These frictional losses are avoided if the driving gear wheel 57 is not mounted on the input shaft 41 but, by means of the radial bearing 93, on a stationary extension 95, as illustrated in FIG. 4. The extension 95 is screwed to a mounting collar 97 of a housing 99 of the transfer case 15. The extension 95 can therefore be manufactured as a separate component and is secured on the housing 99 only during the assembly of the transfer case 15. As an alternative, it is also possible to form the extension 95 integrally with the housing 99.

The extension 95 extends into an interspace between the input shaft 41 and a radial inner side of an aperture 96 in the driving gear wheel 57. Here, the extension 95 is configured in such a way that it does not touch the input shaft 41 so as to minimize frictional losses. In special cases, provision can be made for an additional radial bearing to be provided between the extension 95 and the input shaft 41. In the embodiment illustrated, however, the input shaft 41 is supported in the housing 99 by a bearing 101 in the portion illustrated. In this case, the bearing 101 is arranged in the region of the mounting collar 97. The mounting collar 97 is therefore not only used to secure the extension 95 but also provides a reinforced region of the housing 99 which allows reliable support for the input shaft 41.

Rolling contact elements of the radial bearing 93, which is, in particular, a needle bearing, are arranged between the inner side of the aperture 96 in the driving gear wheel 57, through which the input shaft 41 extends coaxially to the driving gear wheel 57, and a radially outer region 103 of the extension 95 serving as a bearing race surface. Since the bearing race surface 103 is hardened, the rolling contact elements of the radial bearing 93 can be in direct contact with the extension 95. The same applies similarly to the inner side of the aperture 96 in the driving gear wheel 57, i.e. said inner side likewise serves as a bearing race surface. Ultimately, therefore, the bearing race surface 103 and the inner side of the aperture 96 in the driving gear wheel 57 act as a bearing inner ring and a bearing outer ring of the radial bearing 93, making assembly easier and minimizing the number of components required. To accommodate the rolling contact elements of the radial bearing 93, the driving gear wheel 57 has a recess 119 radially on the inside, the recess 19 being bounded laterally by rims 119a, 119b extending in a radial direction.

In the axial direction, the gear wheel 57 is supported on the left by means of a thrust washer 117 on a flange portion 105 of the extension 95, which in turn is connected to the mounting collar 97. On the right, the driving gear wheel 57 is supported on a snap ring 107 secured on the extension 95.

The other components of the transfer case 15 which are illustrated in FIG. 4 correspond essentially to those of the known transfer case 15'. In particular, the driving gear wheel 57 is a chain sprocket of a chain drive 59. As a departure from the design of transfer case 15', the driving gear wheel 57 is connected to the clutch cage 53 of a friction clutch 49 of a clutch unit 47. The type of connection between the driving gear wheel 57 and the clutch unit 47 is a matter of free choice, depending on requirements.

Figure 5:
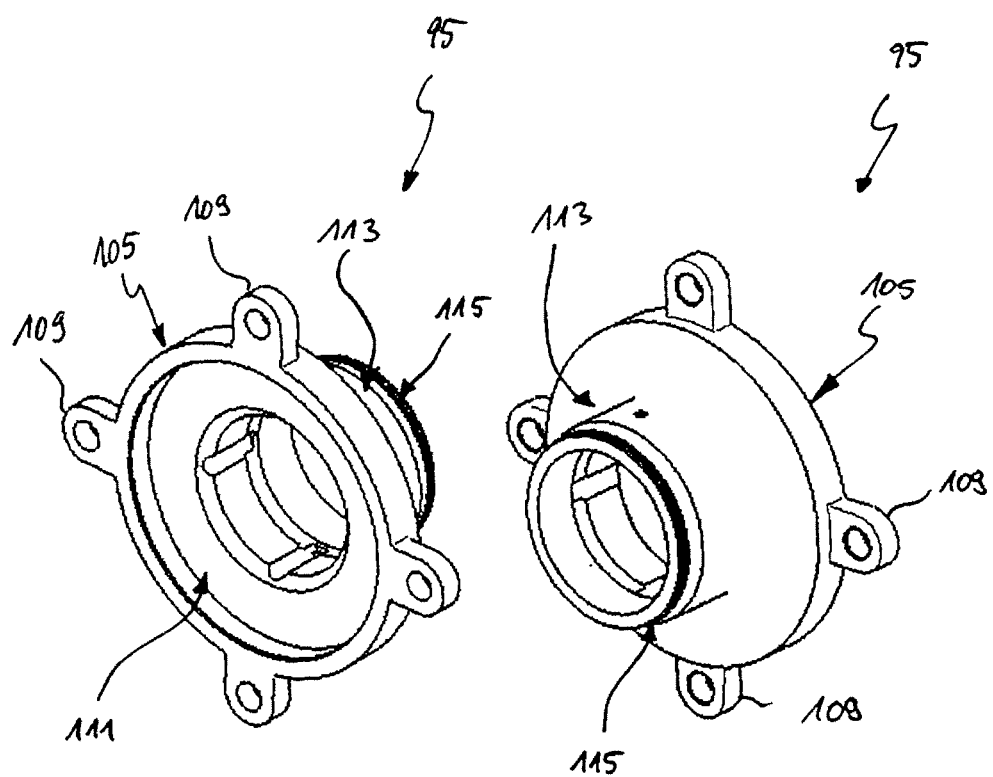
FIG. 5 illustrates perspective views of an extension supporting the gear wheel of the offset drive of the transfer case.

FIG. 5 illustrates perspective views of the extension 95. Extension 95 has fastening segments 109, with the aid of which the extension 95 can be secured on the housing 99. The fastening segments 109 extend radially outward from the flange portion 105. The flange portion 105 defines a recess 111, which is of complementary design to the mounting collar 97 in order to ensure accurate fitting of the extension 95 on the housing 99. Guide elements—e.g. guide projections and complementary guide grooves—of complementary design can be provided on the mounting collar 97 and the flange portion 105 in order to simplify the mounting of the extension 95.

Extending in an axial direction from the flange portion 105 there is a hollow-cylindrical bearing portion 113, which surrounds the input shaft 41 in the manner of a sleeve and without contact in the assembled state and the radial outer side of which is provided with the bearing race surface 103 to provide support for the driving gear wheel 57. At the end remote from the flange portion 105, the bearing portion 113 is provided with a groove 115 to accommodate the snap ring 107.

Mounting the driving gear wheel 57 on the extension 95 and hence ultimately on the housing 99 has the effect that no torque losses occur in the transfer case 15 when that part of the powertrain which is allocated to the driving gear wheel 57 is deactivated. Moreover, the input shaft 41 is not subjected to bending moments produced by the chain drive 59 provided to overcome the parallel offset between the axis A of rotation of the input shaft 41 and an axis B of rotation of the second output shaft 45. If the driving gear wheel 57 were mounted on the input shaft 41, these bending moments would be transmitted to the shaft, and this would have to be taken into account in the design thereof. When the transfer case 15 is embodied in accordance with the invention, the input shaft 41 and the components supporting it (e.g. the bearing 101) can be given smaller dimensions since the bending moments mentioned can be absorbed by the extension 95—and therefore ultimately by the housing 99.

LIST OF REFERENCE SIGNS 11 motor
13 main transmission
15, 15' transfer case
17, 25 cardan shaft
19 rear axle differential
21, 29 wheel
23 rear axle
27 front axle differential
31 front axle
41 input shaft
43 first output shaft
45 second output shaft
47 clutch unit
49 friction clutch
51 actuator
53 clutch cage
55 clutch hub
57 driving gear wheel
59 chain drive
61 driving gear wheel
63 clutch
64 supporting ring
65 actuating ring
67, 69 ball groove
71 ball
73 contact pressure ring
75 diaphragm spring arrangement
77, 79 actuating lever
83 roller
87 side face
89 control disk
91 splined stub
93 radial bearing
95 extension
96 aperture
97 mounting collar
99 housing
101 bearing
103 bearing race surface
105 flange portion
107 snap ring
109 fastening segment
111, 119 recess
113 bearing portion
115 groove
117 thrust washer
119 recess
119a, 119b rim
A, B axis of rotation
C axis

What is claimed is:

1. A transfer case for transferring a driving torque of a driving unit of a motor vehicle to a first axle and a second axle of the motor vehicle, the transfer case comprising:
    an input shaft allocated to the driving unit;
    a first driven shaft allocated to the first axle, and a second driven shaft allocated to the second axle and which is offset parallel to the input shaft;
    a housing configured to rotatably support each of the input shaft and the first and second driven shafts, the housing having a mounting collar defining an aperture and a tubular extension extending axially from the mounting collar, wherein the input shaft extends through the aperture in the mounting collar and at least a portion of at least one of the input shaft and the first driven shaft is coaxially surrounded by the tubular extension; and
    an offset drive coupled for rotation with the second driven shaft, wherein the offset drive comprises a gear wheel rotatably mounted on the extension.

2. The transfer case as claimed in claim 1, wherein the gear wheel comprises an aperture through which the tubular extension of the housing extends coaxially.

3. The transfer case as claimed in claim 1, wherein the first driven shaft is connected to the input shaft with continuous driving effect.

4. The transfer case as claimed in claim 1, wherein the tubular extension rotatably supporting the gear wheel is mounted to the mounting collar of the housing.

5. The transfer case as claimed in claim 1, wherein the tubular extension rotatably supporting the gear wheel is an integral sleeve-shaped portion of the housing, at least sectionwise, and which is arranged, at least sectionwise, between the gear wheel and the input shaft or the first driven shaft.

6. The transfer case as claimed in claim 4, wherein the extension is secured releasably on the housing of the transfer case.

7. The transfer case as claimed in claim 4, wherein the extension surrounds the input shaft or the first driven shaft without making contact.

8. The transfer case as claimed in claim 4, wherein a bearing is arranged between the gear wheel and the extension.

9. The transfer the case as claimed in claim 8, wherein, radially on the outside, the extension has a bearing race surface, which interacts with rolling contact elements of the bearing, and wherein the bearing race surface is a hardened section of the extension.

10. The transfer case as claimed in claim 4, wherein the extension is mounted in an accurate position on the housing by means of a centering device, and wherein the centering device comprises at least one guide element formed on the extension and which interacts with at least one centering element of complementary configuration formed on the housing.

11. The transfer case as claimed in claim 4, wherein the housing has the mounting collar on which the extension is releasably secured.

12. The transfer case as claimed in claim 11, wherein the input shaft or the first driven shaft is rotatably supported by the housing in the region of the mounting collar.

13. The transfer case as claimed in claim 4, wherein the gear wheel is supported on the extension in the axial direction.

14. The transfer case as claimed in claim 1, wherein the gear wheel is a chain sprocket of a chain drive or meshes with an idler gear of a gear drive.

15. A powertrain having a transfer case for transferring a driving torque of a driving unit of a motor vehicle to a first axle and a second axle, the transfer case comprises a housing, an input shaft allocated to the driving unit, a first driven shaft allocated to the first axle, a second driven shaft allocated to the second axle and which is offset parallel to the input shaft, an offset drive for transmitting driving torque from the input shaft or the first driven shaft to the second driven shaft and having a gear wheel coaxial to the input shaft or to the first driven shaft and being rotatably mounted on a section of the housing, and a clutch unit by means of which the second driven shaft can be supplied selectively with driving torque, and wherein the powertrain comprises a clutch which is arranged between the clutch unit of the transfer case and at least one wheel of the motor vehicle and the purpose of which is to deactivate a section of the powertrain situated between the clutch unit and the clutch.

16. A transfer case for transferring a driving torque of a driving unit of a motor vehicle to a first axle and a second axle, the transfer case comprising:
  a housing having a mounting collar section defining an aperture;
  an input shaft adapted to receive the driving torque from the driving unit and which extends through said aperture in said mounting collar section of said housing;
  a bearing for rotatably mounting said input shaft within said aperture;
  a first output shaft adapted for connection to the first axle;
  a second output shaft adapted for connection to the second axle;
  a tubular extension extending axially from said mounting collar section and coaxially surrounding at least a portion of at least one of said input shaft and said first output shaft; and
  an offset drive coupled for rotation with said second output shaft and including a gear wheel coaxially surrounding said extension.

17. The transfer case as claimed in claim 16 further including a second bearing for rotatably supporting said gear wheel on said extension.

18. The transfer case as claimed in claim 17 wherein said input shaft and said first output shaft are interconnected and supported for common rotation about a first rotary axis, wherein said second output shaft is supported for rotation about a second rotary axis offset relative to said first rotary axis, and further comprising a clutch unit for selectively coupling said gear wheel to one of said input shaft and said first output shaft to transmit the driving torque through said offset drive to said second output shaft.

19. The transfer case as claimed in claim 16 wherein said extension is secured releasably to said mounting collar section of said housing, wherein said extension includes a sleeve portion having an inner surface surrounding said input shaft and an outer surface, and a flange portion extending radially from said sleeve portion, wherein said flange portion defines a recess configured to receive said mounting collar section of said housing therein, wherein said gear wheel includes an inner surface surrounding said sleeve portion of said extension, and wherein a second bearing is disposed between said outer surface of said sleeve portion and said inner surface of said gear wheel for rotatably mounting said gear wheel for rotation relative to said extension.

20. A transfer case for use in a motor vehicle to transfer a driving torque from a driving unit to first and second axles, comprising:
  an input shaft aligned for rotation about a first rotary axis and adapted for connection to the driving unit;
  a first output shaft aligned for rotation about said first rotary axis and adapted for connection to the first axle;
  a second output shaft aligned for rotation about a second rotary axis and adapted for connection to the second axle, said second rotary axis being offset relative to said first rotary axis;
  a housing configured to rotatably support said input shaft and said first and second output shafts, said housing having a mounting collar defining an aperture and a tubular extension extending axially relative to said mounting collar, wherein said input shaft extends through said aperture in said mounting collar; and
  an offset drive for transmitting driving torque from said input shaft to said second output shaft, said offset drive including a first rotary component that is drivingly coupled to a second rotary component fixed for rotation with said second output shaft, wherein said first rotary component is rotatably mounted on said tubular extension which is secured to or formed integrally with said housing, and wherein at least one of said input shaft and said first output shaft coaxially extends through an aperture formed in said extension.

21. The transfer case as claimed in claim 16 wherein said extension is integrally formed so as to extend axially from said mounting collar section of said housing, wherein said integral extension includes a sleeve portion having an inner surface surrounding said input shaft and an outer surface, wherein said gear wheel includes an inner surface surrounding said sleeve portion of said extension, and wherein a second bearing is disposed between said outer surface of said sleeve portion and said inner surface of said gear wheel for rotatably mounting said gear wheel for rotation relative to said extension.

* * * * *